United States Patent
Higginbotham et al.

[15] 3,649,043
[45] Mar. 14, 1972

[54] VEHICLE LEVELING SYSTEM

[72] Inventors: William W. Higginbotham, Monroe; Charles L. Branaham, La Salle, both of Mich.

[73] Assignee: Monroe Auto Equipment Co., Monroe, Mich.

[22] Filed: Mar. 23, 1970

[21] Appl. No.: 21,895

[52] U.S. Cl..........................280/124 F, 267/11 A, 267/65 C
[51] Int. Cl..........................................................B60g 21/06
[58] Field of Search....................267/65 C, 11 A; 280/124 F

[56] References Cited

UNITED STATES PATENTS 3,071,394   1/1963   Miller..................................280/124 F
2,904,346   9/1959   Herbenar............................280/124 F Primary Examiner—Philip Goodman
Attorney—Harness, Dickey & Pierce

[57] ABSTRACT

A vehicle leveling system comprising a pair of fluid actuatable leveling devices for controlling the relative attitude between sprung and unsprung portions of a vehicle; a fluid reservoir for supplying actuating fluid to the leveling devices and fluid passage defining means for transmitting the fluid between the source thereof and the devices; pumping means including a vacuum operated hydraulic pump; fluid accumulator means for receiving fluid from the source thereof and transmitting the same to the leveling devices, and valve means actuatable in response to predetermined relative movement between the sprung and unsprung portions of the vehicle for controlling the flow of actuating fluid to the leveling devices.

34 Claims, 7 Drawing Figures

Patented March 14, 1972

INVENTORS.
William W. Higginbotham,
BY Charles L. Branham.
Harness, Dickey & Pierce
ATTORNEYS.

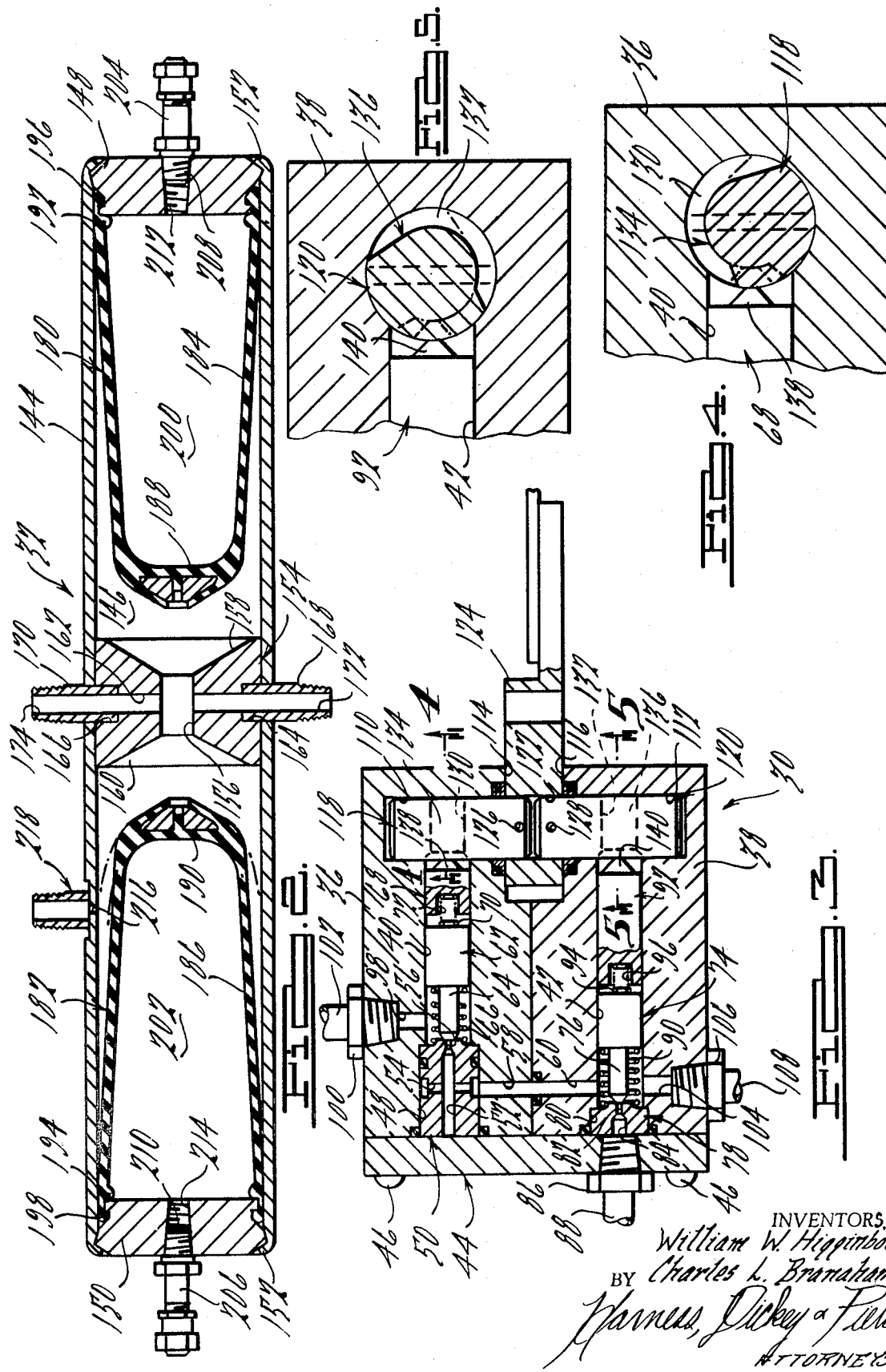

Patented March 14, 1972

INVENTORS.
William W. Higginbotham,
Charles L. Branaham,
BY Harness, Dickey & Pierce
ATTORNEYS.

VEHICLE LEVELING SYSTEM

BACKGROUND OF THE INVENTION

During the last several years, the need for greater load-carrying capacity in automotive vehicles has continuously increased. This need has resulted from various factors such as increased vehicle dimensions, larger engines, and the more frequent use of automobiles for pulling trailers and the like and for carrying as many as six passengers along with heavy loads such as baggage, merchandise and sporting equipment. These uses have substantially increased the loads imposed upon the vehicle suspension systems at the rear end of the vehicles, causing a serious reduction in the clearance between the rear axles of the vehicles and the frame or body portions thereof. This, of course, has resulted in frequent bottoming or engagement of these portions of the vehicles when the vehicles are driven over bumpy roads and the like, thus eliminating to a large extent the effectiveness of the vehicle suspension systems. In addition, when the vehicle rear ends are heavily loaded, the front ends of the vehicles are disposed considerably above the rear portions thereof, thereby causing the vehicle's headlight beams to be directed upwardly and also serious impairment of rearward vision. Also, when the rear ends of vehicles are disposed below the front ends thereof, the vehicles lose a certain amount of stability required for high-speed turns made on modern turnpikes, expressways, toll roads and the like.

The seriousness of these problems has heretofore been recognized in the automobile industry, as evidenced by the development of a large variety of auxiliary suspension units which frequently take the form of coil springs, flat leaf springs, air cylinders and the like; however, it has been found that when such auxiliary suspension components have been incorporated in existing vehicle suspension systems, the performance and more particularly the balance of such systems is frequently adversely affected. In addition, many of such previously known auxiliary units have been difficult to install; have required the use of special fittings, complex brackets and the like; and have not been universally applicable to various designs and makes of vehicles. Also, in many instances such auxiliary units have materially affected the attitude of the vehicles when they are unloaded, i.e., they frequently raise the rear ends of the vehicles relative to the axles thereof, thus adversely affecting the appearance of the vehicles and the overall ride characteristics thereof when the vehicles are substantially unloaded or only lightly loaded.

SUMMARY OF THE INVENTION

This invention relates generally to a new and improved vehicle leveling system adapted to automatically maintain the body portion of a vehicle in a substantially level attitude regardless of the degree of loading imposed thereon. More particularly, the present invention relates to a vehicle leveling system of the above character adapted to pump a preselected quantity of an actuating fluid to and from an associated leveling mechanism, such as the vehicle's shock absorbers or the like, in accordance with preselected changes in the attitude of the spring-supported body portion of the vehicle with respect to the unsprung supported axle portion thereof.

It is accordingly a primary object of the present invention to provide a new and improved vehicle leveling system adapted to overcome the heretofore encountered loading problems associated with automotive vehicles.

It is another object of the present invention to provide a new and improved vehicle leveling system of the above character which is adapted to utilize a vacuum power source, as can be provided by the vehicle's engine, for pumping actuating fluid to the associated leveling mechanism.

It is still another object of the present invention to provide a new and improved leveling system of the above character which is entirely automatic in operation and which is adapted to be used on virtually all types of automotive vehicles, thereby providing for universality of installation.

It is still another object of the present invention to provide a new and improved leveling system for the above character that is extremely stable in operation and which will not be prematurely energized when the vehicle is braking, accelerating or traversing road irregularities or the like.

It is a further object of the present invention to provide a new and improved leveling system of the above character which is durable in operation and may be easily installed on a vehicle.

It is still a further object of the present invention to provide a new and improved leveling system of the above character that is of a relatively simple design, consists of readily available component parts and is therefore economical to commercially manufacture.

It is a further object of the present invention to provide a new and improved leveling system of the above character which utilizes a novel leveling valve which functions to control the flow of actuating fluid between a source thereof and the associated vehicle leveling devices to effect selective actuation thereof.

It is another object of the present invention to provide a new and improved fluid accumulator for use in the leveling system of the present invention.

It is still a further object of the present invention to provide a new and improved vehicle leveling system which incorporates a combination fluid accumulator and pump arrangement.

Other objects, features and advantages of the present invention will become apparent from the following detailed description taken in conjunction with the accompanying drawings.

BRIEF DESCRIPTION OF THE DRAWINGS

FIG. 2 is a longitudinal cross-sectional view of the fluid accumulator incorporated in the vehicle leveling system of the present invention;

FIG. 3 is a transverse cross-sectional view of the leveling valve incorporated in the vehicle leveling system of the present invention;

FIG. 4 is an enlarged cross-sectional view taken substantially along the line 4—4 of FIG. 3;

FIG. 5 is an enlarged cross-sectional view taken substantially along the line 5—5 of FIG. 3;

DETAILED DESCRIPTION OF A PREFERRED EMBODIMENT

Figure 1:
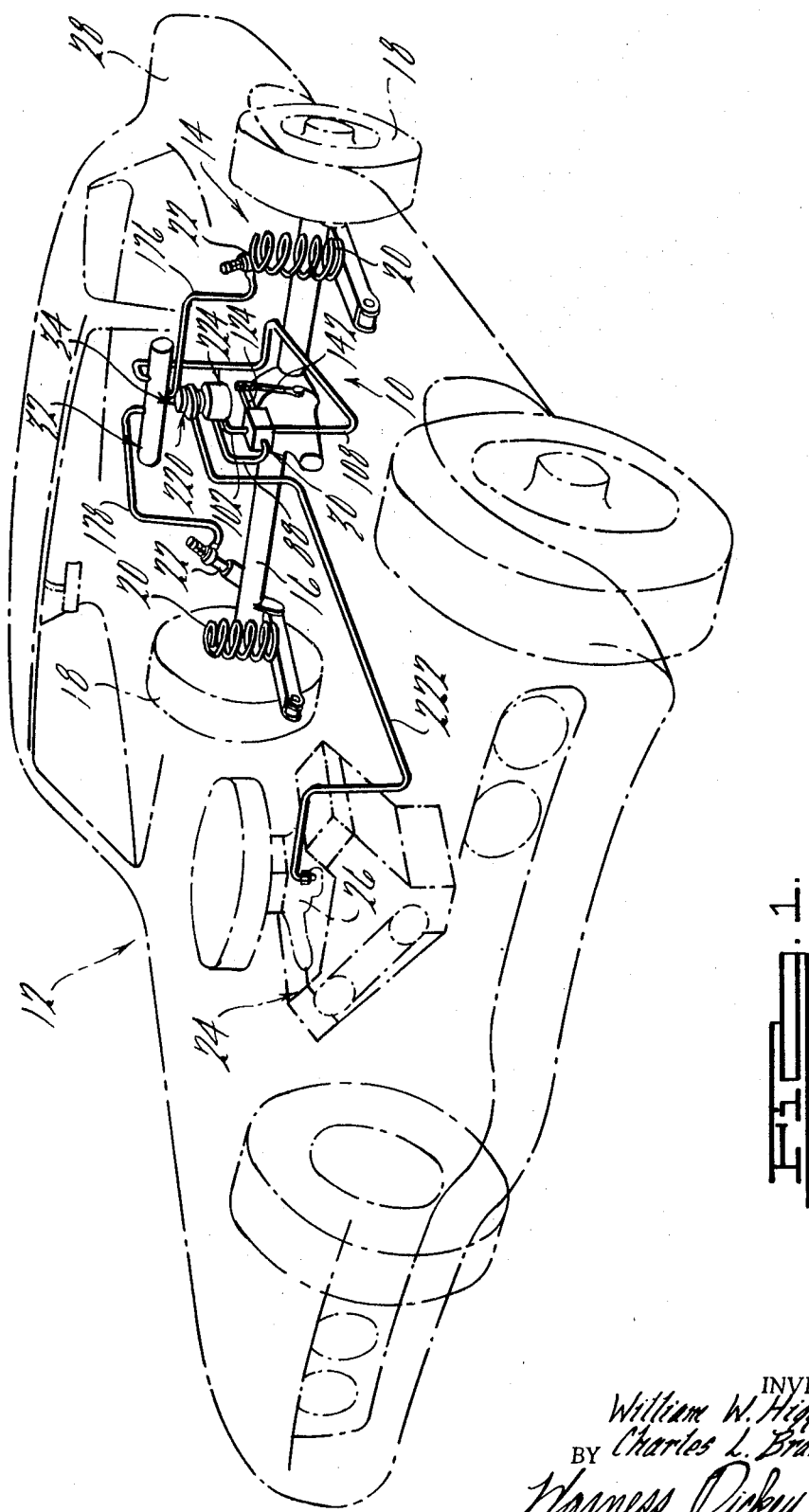
FIG. 1 is a schematic representation of the vehicle leveling system of the present invention as shown in operative association with a typical automotive vehicle.

Referring now in detail to the drawings, a vehicle leveling system 10, in accordance with an exemplary embodiment of the present invention, is shown in operative association with a conventional automotive vehicle 12 having a rear suspension system 14 including a transversely extending rear axle assembly 16 adapted to operatively support the vehicle's rear wheels 18. The axle assembly 16 is operatively connected to the vehicle 12, at least in part, by means of a pair of helical coil springs or the like 20 and a pair of conventional hydraulically actuated leveling assemblies 22 which may be and preferably consist of a pair of hydraulically actuated shock absorbers or the like of any suitable type well known in the art. The automotive vehicle 12 is provided with a conventional internal combustion engine 24 having an intake manifold 26 or an equivalent source of vacuum pressure which is adapted to function in a manner hereinafter to be described in providing a source of fluid pressure for actuating the leveling system 10.

Generally speaking, the leveling system 10 of the present invention comprises three separate but cooperative assemblies which function to supply hydraulic actuating fluid from a suitable source thereof to the leveling devices or shock absorbers 22 to effect raising or lowering of the vehicle chassis or body 28 with respect to the axle assembly 16 in response to various load conditions imposed upon the vehicle 12, whereby the vehicle body or chassis 28 will be maintained in a substantially level attitude regardless of the degree of the loading thereof. Briefly, the aforesaid assemblies, which are hereinafter described in detail, comprise a leveling valve assembly 30 which functions to sense changes in attitude between the axle assembly 16 and the chassis 28, a fluid accumulator assembly 32 which functions to selectively communicate hydraulic actuating fluid to the leveling devices 22, and a fluid pumping assembly 34 which is operable in response to operation of the vehicle engine 24 to pump hydraulic actuating fluid from a suitable fluid source thereof to the accumulator assembly 32.

Referring now in detail to the construction of the leveling valve assembly 30, as best seen in FIG. 3, the assembly comprises a pair of adjacently oriented housing sections 36 and 38 which define a pair of spaced parallel bores 40 and 42, respectively, that are closed at their respective left ends by means of an end cover plate or the like 44 attached to the housing sections 36, 38 through suitable fastening means 46. The bore 40 is formed with an enlarged diameter counterbore 48 adjacent the left end thereof within which a generally cylindrically-shaped manifold member 50 is operatively disposed. The member 50 defines a longitudinally extending bore 52 and is provided with a cross bore 54 which intersects and is thus communicable with the bore 52, as illustrated. The right end of the bore 52 is formed with a reduced diameter restriction 56 which is communicable with the interior of the bore 40 and with the bores 52 and 54, is adapted to communicate the interior of the bore 40 with a pair of aligned passages 58 and 60 formed in the housing sections 36 and 38, respectively, which passages 58, 60 in turn communicate the bore 40 with the bore 42.

Disposed within the bore 40 is a longitudinally slidable piston member 62 which comprises a reduced diameter nose portion 64 adapted to engage the right end of the member 50 and thereby block fluid flow between the bore and the restriction 56. A helical coil spring 66 extends circumjacent the nose portion 64 and abuts at one end thereof against the member 50 and at the opposite end thereof against the piston 62, with the spring 66 functioning to resiliently urge the piston 62 away from the right end of the manifold member 50, as will be apparent. Disposed on the opposite side of the piston member 62 from the manifold member 50 is a plunger member 68 which, like the piston 62, is longitudinally slidable within the bore 40. A second helical coil spring 70 is interposed between the piston 62 and plunger member 68, with the right end of the spring 70 being nestingly received within a suitable annular recess 72 formed in the left end of the plunger 68.

The bore 42 is provided with a piston member 74 which is similar in construction to the member 62 and is provided with a nose portion 76 adapted to abut against the right end of a manifold member 78 located within a counterbore 80 formed in the left end of the bore 42. The member 78 defines a restricted orifice or flow passage 82 which is communicable via a suitable fluid passage 84 with a fluid fitting 86 operatively mounted within the plate 44 and adapted to secure one end of a fluid conduit 88 in fluid communication with the passage 84. A helical coil spring 90 extends circumjacent the nose portion 76 of the piston 74 and functions to resiliently bias the piston 74 toward the right in FIG. 3, whereby the nose portion 76 is disengaged from the member 78, i.e., toward a position wherein the portion 76 does not block fluid flow from the bore 42 to the fluid passage 84. Disposed within the right end of the bore 42 is a plunger member 92 which is similar to the member 68 and is longitudinally slidable within the bore 42 along with the piston 74. A coil spring 94 is interposed between the plunger member 92 and the piston 74 and is nestingly received at the right end thereof within an annular recess 96 formed in the left end of the plunger 92.

The bore 40 is communicable via a transversely extending fluid passage 98 with a fluid fitting 100 that is operatively secured to the housing section 36 and functions to secure one end of a fluid conduit 102 in fluid communication via the passage 98 with the bore 40. Similarly, the bore 42 is formed with a transversely extending fluid passage 104 which is communicable with a fluid fitting 106 that is secured to the housing section 38 and functions to operatively maintain a fluid conduit 108 in fluid communication via the passage 104 with the bore 42. Briefly, in operation of the leveling valve assembly 30, actuating fluid is adapted to be supplied from the fluid pumping assembly 34 via the conduit 102. Assuming the piston 62 is in the position shown in FIG. 3, fluid is retained within the bore 40; however, at such time as the piston moves toward the right, the fluid in the bore 40 will pass through the restricted orifice 66 and then through the bores and passages 52, 54, 58, 60 to the bore 42. When the piston 74 is disposed in the position shown in FIG. 3, the fluid thus communicated to the bore 42 will flow through the passage 104 and fitting 106 to the conduit 108 which is communicable with the fluid accumulator assembly 32. At such time as the piston 74 is biased toward the right from the position shown in FIG. 3 under the influence of the spring 90, the nose portion 76 thereof will be disengaged from the member 78 to permit fluid flow from the interior of the bore 42 through the restricted orifice 82 to the conduit 88 which is communicable with a fluid reservoir, hereinafter to be described, which is associated with the pumping assembly 34.

The right ends of the housing sections 36, 38 are formed with a pair of aligned transversely extending bores 110 and 112 which intersect and are operatively communicable with the longitudinally extending bores 40 and 42 and with a pair of inwardly formed recessed areas 114 and 116 provided at the right ends of the housing sections 36, 38 at the mutually confronting sides thereof. Disposed within the bores 110, 112 is a pair of generally cylindrically-shaped actuating members 118 and 120, respectively, which are relatively rotatable within the bores 110, 112 and are adapted to be fixedly secured within an annular opening 122 of an elongated actuating arm 124 by means of a pair of transversely extending fastening elements or pins 126 and 128, respectively. It will be seen that one end of the arm 124 is received within the area defined by the recesses 114, 116 in a manner such that the opening 122 is aligned with the bores 110, 112, as illustrated in FIG. 3. With the above construction, relative pivotal movement of the actuating arm 124 with respect to the housing sections 36, 38 will effect simultaneous rotational movement in the same direction of the actuating members 118, 120 within the bores 110, 112.

The actuating members 118, 120 are provided with radially inwardly formed recessed areas 130 and 132 at axial positions thereon aligned with the bores 40 and 42, respectively. The recessed areas 130, 132 define a pair of eccentric camming surfaces 134 and 136 which, as best illustrated in FIGS. 4 and 5, extend approximately 180° around the actuating members 118 and 120, respectively. The camming surfaces 134, 136 are adapted to be cammingly engaged with a pair of longitudinally outwardly extending embossed portions 138 and 140 formed on the longitudinally outer ends of the plunger members 68 and 92, respectively. The longitudinal or axial dimensions of the embossed portions 138, 140, as well as the particular configuration of the recessed areas 130, 132 and spring forces of the coil springs 66, 70 and 90, 94, are such that when the embossed portions 138, 140 are engaged with the outer periphery of the members 118, 120, i.e., are disengaged from the recessed areas 130, 132 as shown by the solid line positions of the members 118 and 120 in FIGS. 4 and 5, the nose portions 64, 76 of the pistons 62, 74 will be maintained in sealing engagement with the right ends of the manifold members 50 and 78, respectively, whereby to block fluid flow between the bores 40 and 42 and the passages 52 and 84, respectively. When the actuating members 118, 120 are rotated such that the recessed areas 130 and 132 move into registry with the embossed portions 138 and 140, resulting in the portions 138, 140 engaging the camming surfaces 132 and 134, the spring forces of the coil springs 66, 70 and 90, 94 are such that the nose portions 64 and 76 will be biased out of engagement with the members 50 and 78 or toward the right in FIG. 3, thereby providing for fluid flow from the bores 40, 42 to the passages 52, 84. It will be seen, therefore, that pivotal movement of the actuating arm 124 and hence rotation of the actuating members 118 and 120 will function to bias the piston members 62 and 74 between positions opening and closing flow paths between the bores 40, 42 and the passages 52, 84 and that the particular circumferential arrangement of the recessed areas 130, 132 will control the sequence or timing in which the piston members 62 and 74 are actuated.

The assembly 30 is adapted to be secured by any suitable means to the sprung portion or chassis 28 of the vehicle 12 and the arm 124 is adapted to be connected to the axle assembly 16 in a manner such that relative movement between the assembly 16 with respect to the chassis 28 will effect relative pivotal movement of the arm 124 and hence rotation of the actuating members 118, 120. Such means for operatively connecting the arm 124 to the axle assembly 16 is preferably provided by a connecting link or arm 142, one end of which is pivotably connected to the axle assembly 16 and the other (upper) end of which is pivotably connected to the end of the actuating arm 124 opposite the valve assembly 30. It will thus be seen that upward and downward movement of the axle assembly 16 will cause the actuating arm 124 to be pivoted in a corresponding manner, thereby causing rotation of the actuating members 118 and 120.

The recessed areas 130 and 132 on the actuating members 118 and 120 are located such that when the vehicle is in a normal relatively unloaded condition, the embossed portions 138 and 140 are engaged with the outer periphery of the members 118, 120, as shown by the solid line positions of the members 118 and 120 in FIGS. 4 and 5. Thus, when the vehicle is unloaded, the piston members 62 and 74 are disposed such that fluid flow is prevented from the interior of the bores 40, 42 to the passages 52 and 84, respectively. At such time as the vehicle becomes loaded, the outer end of the actuating arm 124 will be biased upwardly, thereby rotating the actuating members 118, 120 in a counterclockwise direction in FIGS. 4 and 5. When this occurs, the actuating member 118 will be biased from the solid line position shown in FIG. 4 to the dotted line position, whereby the recessed area 130 will initially move into registry with the embossed portion 138, thereby permitting the piston member 62 to be moved toward the right in FIG. 3 under the influence of the coil spring 66 so that fluid flow will be provided from the interior of the bore 40 to the passage 52. Due to the fact that the recessed area 132 is circumferentially offset a predetermined amount from the area 130 (see FIGS. 4 and 5), the piston member 74 will be maintained in its respective closed position, blocking fluid flow from the bore 42 to the passage 84; however, at such time as the actuating arm 124 is biased downwardly resulting in clockwise rotation of the members 118, 120, the actuating members 120 will be biased from the solid line position in FIG. 5 to the dotted line position in this figure, whereby the embossed portion 140 will move into the recessed area 132 and the piston member 74 will be biased away from the manifold member 78 to open a flow path from the interior of the bore 42 to the passage 84, as will be described in connection with the overall operation of the leveling system 10 of the present invention.

Referring now in detail to construction of the fluid accumulator assembly 32, as best seen in FIG. 2, the assembly 32 comprises an elongated cylindrical housing 144 which defines an internal chamber 146. The longitudinally opposite ends of the housing 146 are adapted to be closed by means of a pair of end closure members 148 and 150 which have the longitudinal marginal ends of the housing 144 crimped or otherwise deformed inwardly, as seen at 152, whereby to fixedly secure the members 148, 150 to the housing 144. Disposed within the chamber 146 approximately midway between the end closure members 148, 150 is a manifold block member 154 which is formed with a longitudinally extending bore or passage 156 that terminates at the opposite ends thereof and a pair of tapered inlet or flow passages 158 and 160, with the passages 156, 158 and 160 functioning to communicate the portions of the chamber 146 on the opposite sides of the block 154.

The manifold block 154 is formed with a transversely or radially extending flow passage 162 which intersects and is communicable at its inner end with the passage 156 and is formed with a pair of counterbores 164 and 166 at the opposite ends thereof. The counterbores 164, 166 are adapted to nestingly receive a pair of fluid fitting members 168 and 170, respectively, with flow passages 172, 174 communicable at the inner end thereof with the passage 162. The radially outer ends of the passages 172 and 174 are adapted to be communicable with a pair of fluid conduits 176 and 178 which are in turn communicable with the elevating assemblies 22 in any conventional manner such that when actuating fluid is pumped to or from the assemblies 22 through the conduits 177, 178, the assemblies 22 will expand or contract to raise or lower the rear end of the vehicle chassis 28 with respect to the axle assembly 16, as will later be described.

Disposed within the interior of the chamber 146 between the opposite sides of the manifold block 154 and end members 148 and 150 is a pair of resilient deformable or compressible, generally dome-shaped diaphragm members 180 and 182. The members 180, 182 are preferably fabricated of a resilient fluid impervious material such as synthetic rubber or the like and comprise generally annular side wall portions 184 and 186, respectively, which extend longitudinally of the housing 144 and taper or converge radially inwardly toward the center thereof. The innermost ends of the members 180, 182 are formed with reinforced domed-like end portions 188 and 190, while the opposite (outer) ends of the members 180, 182 define mounting or securing end portions 192 and 194, respectively, defining securing lips or shoulders 196 and 198, respectively, that are adapted to be clampingly received between the end members 148 and 150 and the adjacent ends of the housing 144. The end portions 192, 194 are thereby adapted to provide fluid-tight seals with the end members 148 and 150, whereby the members 148, 150 and diaphragm members 180, 182 define a pair of gas-tight compressible chambers 200 and 202 which are adapted to be charged with a gaseous material, such as nitrogen or some other suitable inert gas. Means for charging the chambers 200, 202 is preferably provided by a pair of gas valves assemblies 204 and 206, respectively, which may be of any suitable construction and have suitable fitting means 208, 210 received within suitable bores or passages 212 and 214 formed in the end members 148 and 150, respectively, and communicable with the interior of the chambers 200 and 202. Preparatory to operation of the leveling system 10 of the present invention, the chambers 200, 202 are adapted to be charged with the aforementioned gas, with the chamber 200 preferably being charged with a gas at a pressure of between 100 and 150 p.s.i. and the chamber 202 being charged at a pressure of between 350 and 400 p.s.i. As will hereinafter be described, the differential pressure to which the chambers 200, 202 are charged serves to provide for an extremely low spring rate for the leveling system 10 and to minimize the amount of actuating fluid required to effect expansion or extension of the elevating assemblies 22 in order to achieve leveling of the vehicle 12 when it is heavily loaded.

As illustrated in FIG. 2, the housing 144 is formed with a restricted orifice 216 at a position adjacent the side wall portion 186 of the diaphragm member 182. The orifice 216 is communicable via a fluid fitting 218 with the fluid conduit 108, whereby actuating fluid may be communicated from the valve assembly 30 to the interior of the accumulator assembly 32. The orifice 216 is located with respect to the diaphragm member 182 such that when the pressure interiorly of the chamber 202 exceeds the fluid pressure within the chamber 146, the side wall portion 186 of the member 182 will expand or deform outwardly and thereby block fluid flow from the orifice 216 into the chamber 146, as indicated by the phantom lines in FIG. 2. This arrangement, therefore, assures that at such time that the fluid pressure within the chamber 146 drops below some preselected pressure level, i.e., below the pressure within the chamber 202, no further fluid will be communicated into the interior of the chamber 146 via the leveling valve assembly 30.

The fluid pumping assembly 34 comprises a vacuum operated pumping mechanism, generally designated 220, which may be of any suitable construction an is preferably located in close proximate relation to the leveling valve assembly 30 and accumulator assembly 32, as shown in FIG. 1. The pumping mechanism 220 is adapted to be communicable with the intake manifold or equivalent source of vacuum pressure 26 of the vehicle engine 24 by means of a suitable vacuum line or conduit 222, as also illustrated in FIG. 1. It will be appreciated, of course, that a suitable vacuum reservoir or the like may be provided for the pumping mechanism 220, or alternatively, the conduit 22 may be operatively connected with the existing vacuum reservoir which may typically be provided on the vehicle 12, as will be apparent to those skilled in the art. Disposed adjacent the pumping mechanism 220 is a suitable fluid reservoir 224 that is adapted to contain a supply of actuating fluid for the leveling assemblies 22 and which is adapted to be communicable via the conduit 102 with the leveling valve assembly 30. Additionally, the fluid reservoir 224 is adapted to be communicable with the leveling valve assembly 30 through the aforementioned conduit 88, whereby fluid may be returned to the reservoir 224 from the accumulator assembly 32. It will be appreciated, of course, that the fluid reservoir 224 may consist of an integral part of the pumping mechanism 220 or may be located remote therefrom without departing from the scope of the present invention and commensurate with the mounting facilities provided by the construction and design of the vehicle 12.

In operation of the vehicle leveling system 10 of the present invention, assuming the initial condition that the vacuum line 222 is communicable with a suitable source of vacuum pressure for operating the fluid pumping device 220, and assuming that the vehicle 12 is in a relatively unloaded condition, the actuating arms 142 and 124 will be disposed in their respective positions shown in FIG. 1, and the actuating members 118 and 120 will be oriented in the solid line position shown in FIGS. 4 and 5. Under these conditions, the piston members 62 and 74 will be located as shown in FIG. 3, whereby to block fluid flow from the bores 40, 42 through the orifices 56 and 82.

At such time as the vehicle 12 becomes loaded to any appreciable degree, the rear end of the chassis 28 will be lowered arm respect to the axle assembly 16. When this occurs, the actuating arm 124 will be biased upwardly, resulting in counterclockwise rotation of the actuating members 118 and 120. As the member 118 is thus rotated, the recessed area 130 will move into registry with the embossed portion 138 of the plunger member 68, resulting in the piston member 62 moving to the right in FIG. 3, with the further result that the nose portion 64 will be moved out of engagement with the end of the manifold member 50. With the piston 62 thus disengaged from the member 50, actuating fluid supplied from the pumping assembly 34 to the valve assembly 30 through the conduit 102 will flow from the bore 40 through the passages 52, 54, 58 and 60 into the bore 42, which fluid will thereafter flow via the bore 42 and conduit 108 to the chamber 146 of the accumulator assembly 32. The fluid will then flow out of the assembly 32 through the conduits 176 and 178 to the leveling assemblies 22, thereby effecting expansion of the assemblies 22 so as to bias the rearward end of the chassis 28 upwardly to a position wherein the chassis 28 is at a relatively level attitude. It will be seen that as the rearward end of the chassis 28 is thus elevated, the rearward end of the actuating arm 124 will be biased downwardly to effect relatively clockwise rotation of the actuating members 118 and 120 in FIGS. 4 and 5. The actuating member 118 is arranged such that when the vehicle chassis 28 is substantially level, the embossed portion 138 will be disengaged from the recessed area 130, i.e., engaged with the outer periphery of the member 118, thereby biasing the piston member 62 to its respective closed position. Thus, at such time as the rearward end of the chassis 28 has reached a level position, the nose portion 64 of the piston 62 will block further flow of actuating fluid from the conduit 102 to the conduit 108.

In operation of the assembly 10, the fluid accumulator assembly 32, and in particular, the compressible diaphragm members 180 and 182 therein, will be compressed a predetermined amount at such time as the fluid pressure within the chamber 146 exceeds the pressure of the compressed gas therewithin, i.e., exceeds, for example, 100 p.s.i. for the diaphragm member 182 and exceeds, for example 350 p.s.i. for the diaphragm member 180. With this arrangement, the quantity of actuating fluid required to effect expansion of the assembly 22 is minimized to the extreme, since the compressed gas within the members 180, 182 continuously urge the members 180, 182 toward their expanded configuration within the chamber 146. More importantly, however, this "double" diaphragm arrangement provides for an extremely low spring rate and hence reduces the frequency of oscillation of the vehicle chassis 28 as the vehicle 12 traverses road bumps and the like.

In the event that the assemblies 22 operate to elevate the rearward end of the chassis 28 upwardly to a position wherein the rearward end of the chassis 28 is above some preselected level position, it will be seen that the actuating member 120 will be rotated in a clockwise direction to a position wherein the embossed portion 140 of the plunger member 92 will be received within the recessed area 132. When this occurs, the piston member 74 will be biased out of engagement with the manifold member 78 by means of the coil spring 90, whereby to provide for fluid flow between the passage 104 and the passage 84. This permits fluid flow from the accumulator assembly 32 via the conduit 108 to the fluid reservoir 224 via the conduit 88. Accordingly, the fluid pressure within the chamber 146 will be reduced with a corresponding reduction in fluid pressure to the leveling mechanisms 22, resulting in lowering of the rearward end of the chassis 28 to a desired level attitude, at which time the actuating arm 124 will rotate the actuating member 120 from the dotted line position shown in FIG. 5 to the solid line position in this Figure, causing leftward movement of the piston member 74 to again block fluid flow from the bore 42 through the orifice 82. It will thus be seen that the leveling valve assembly 30 functions to communicate actuating fluid from the reservoir 224 to the leveling mechanisms 22 when the rearward end of the chassis 28 is loaded a predetermined amount, resulting in expansion of the mechanisms 22 to effect raising and hence leveling of the rearward end of the chassis 28. Further, the valve assembly 30 functions to return fluid from the accumulator assembly 32 to the reservoir 224 and hence reduce the fluid pressure of the mechanisms 22 at such time as the rearward end of the chassis 28 is located above some preselected level position.

In the event the fluid pressure in the mechanisms 22 drops below some predetermined pressure level, for example, as might occur when the rearward end of the chassis 28 is for any reason jacked up or otherwise elevated, the pressure within the chamber 146 of the housing 144 will drop below the pressure within the chamber 202 defined by the diaphragm 182. When this occurs, the side wall portion 186 of the member 182 will expand or deform radially outwardly blocking any fluid flow from the conduit 108 to the assembly 32 so as to prevent inadvertent actuation or expansion of the mechanisms 22.

It will be noted that a particular feature of the present invention resides in the fact that the orifice 56, 82 and 216 restrict the flow of fluid through the leveling system 10 so that no damping is required of either of the actuating arms 124, 142 or actuating members 118 or 120 in order to prevent inadvertent actuation of the leveling valve assembly 30 when the vehicle traverses road bumps or similar surface irregularities which cause momentary changes in attitude of the vehicle chassis 28 with respect to the axle assembly 16.

Figure 6:
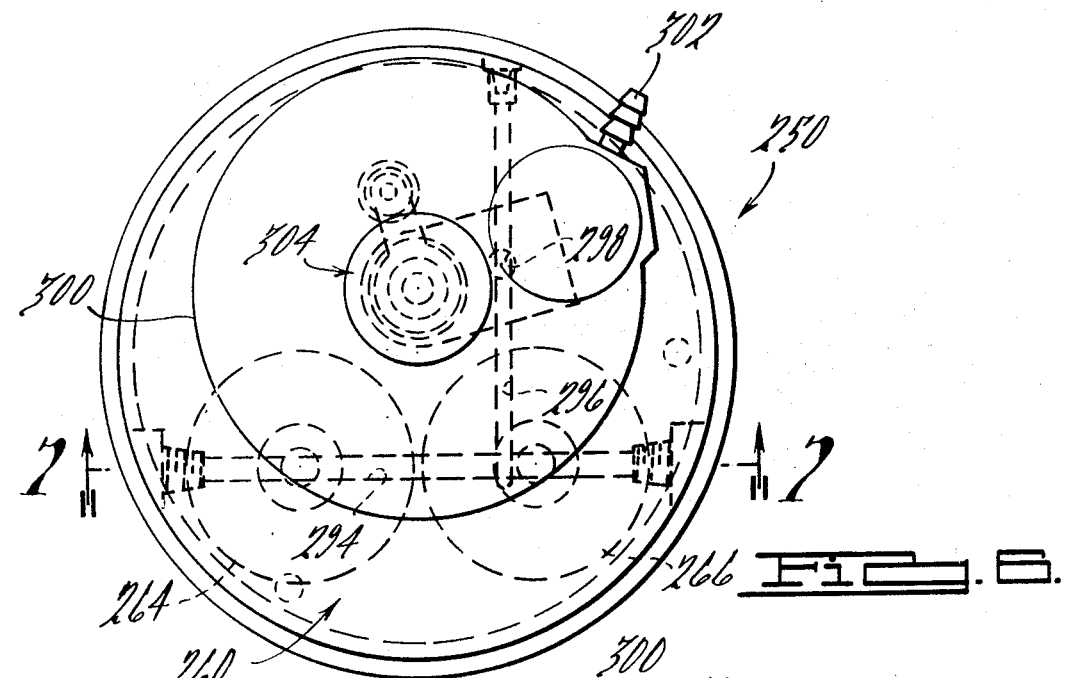
FIG. 6 is a top elevational view of a combination fluid pump and accumulator in accordance with a modified embodiment of the present invention.
Figure 7:
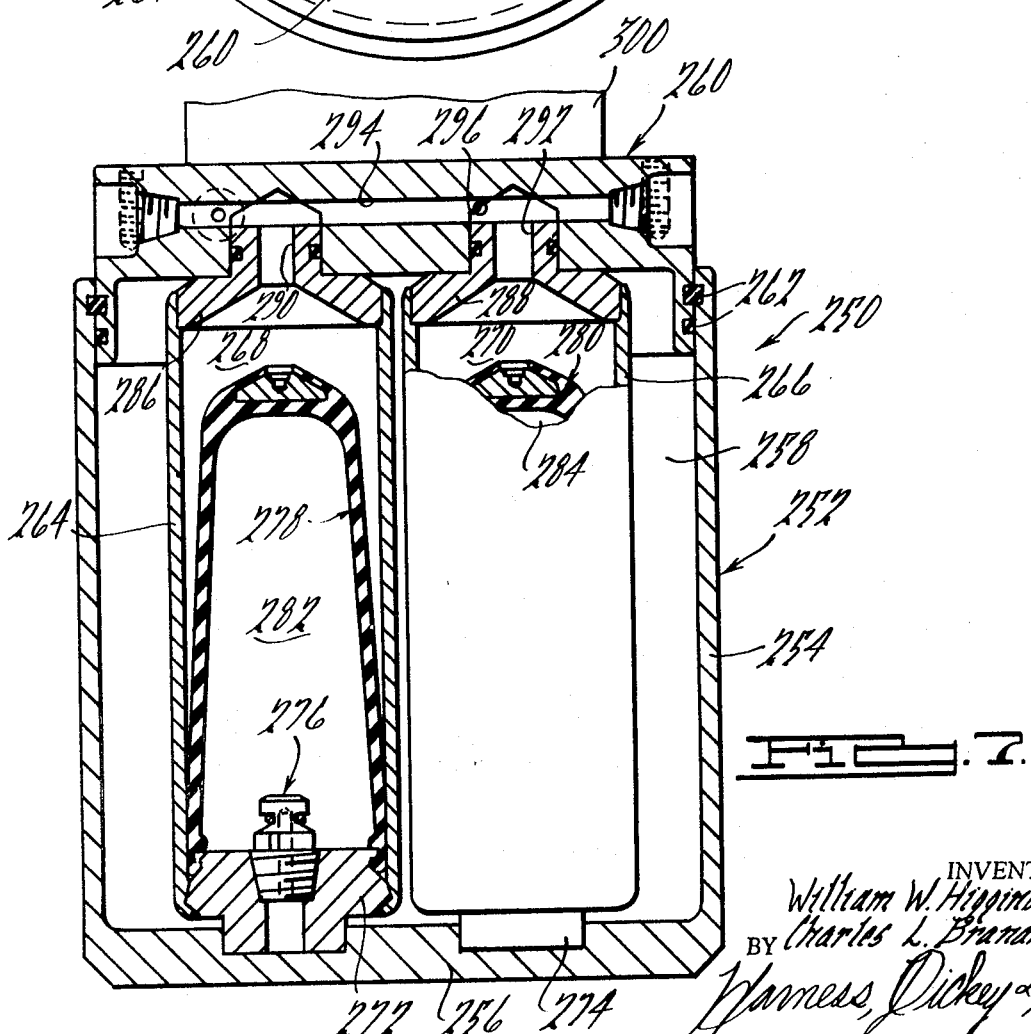
FIG. 7 is a transverse cross-sectional view taken substantially along the line 7—7 of FIG. 6.

FIGS. 6 and 7 illustrate a slightly modified embodiment of the present invention wherein the fluid accumulator assembly and fluid pumping assembly are combined in a single unitized arrangement, whereby to minimize to the extreme, the space required for these components and to facilitate mounting and assembly thereof within the associated vehicle. In particular, a combination fluid accumulator and pumping assembly 250 is shown in FIGS. 6 and 7 as comprising a generally cylindrically shaped enclosure or housing 252 having an annular side wall section 254 which is closed at the lower end thereof by an integral bottom or lower end section 256 and defined therewith a generally annular chamber or compartment 258. Disposed within the upper end of the enclosure 252 is a combination cover manifold member 260, the lower end of which is provided with suitable sealing means 262 and is adapted to be received within the confines of the upper end of the side wall section 254, whereby to close the top of the chamber 258.

Disposed within the chamber 258 is a pair of adjacently oriented generally cylindrically-shaped sleeve members 264 and 266 which define a pair of cylindrical compartments 268 and 270, respectively. The lower ends of the compartments 268, 270 are closed by a pair of end members 272 and 274 which are provided with suitable valve assemblies, generally designated 276, that are analogous to and adapted to function similar to the aforedescribed assemblies 204 and 206 in supplying pressurized gas to the interior of a pair of diaphragm members 278 and 280 which may be and preferably are identical in construction to the members 180 and 182 hereinabove described. As will be apparent, the lower ends of the diaphragm members 278 and 280 sealingly engage the end members 272, 274 and sleeve members 264, 266, respectively, and define with the end members 272, 274 a pair of pressure chambers 282 and 284 which are adapted to be charged with pressurized gas in the same manner as the chambers 200 and 202 of the assembly 32.

The upper ends of the compartments 268 and 270 are adapted to be closed by a pair of closure members 286 and 288 which are sealingly connected to the upper ends of the members 264, 266, respectively, and define upwardly extending fluid passages 290 and 292, respectively. The passages 290, 292 are communicable with a transversely extending fluid passage 294 which is formed in the member 260 and is communicable at the opposite ends thereof via suitable fluid fitting means and conduits (not shown) with the leveling mechanisms 22. The passage 294 is communicable with an intersecting fluid passage 296 that is formed in the member 260 and is communicable with an upwardly extending fluid passage 298. The passage 298 is in turn communicable with a vacuum operated pumping mechanism, representatively designated by the numeral 300, that may be and preferably is mounted on the top of the member 260 and which is communicable with a suitable source of vacuum pressure via a suitable vacuum line 222 that is connected to the mechanism 300 through a suitable fitting 302.

In operation of the assembly 250, the interior of the chamber 258 is adapted to act as a fluid reservoir and contain a supply of actuating fluid for the leveling mechanisms 22. At such time as such fluid is required for actuating the mechanisms 22, as determined by the operation of an associated leveling valve assembly, such as the assembly 30, the pumping mechanism 300 will pump fluid from the interior to the chamber 258 by means of a suitable pumping piston or the like, representatively designated by the numeral 304. This fluid will be pumped through the passages 298, 296 and 294 to the interior of the compartments 268 and 270, and through the passage 294 to the associated leveling mechanisms 22, with the diaphragm members 278 and 280 functioning in a manner hereinabove described in minimizing the amount of actuating fluid required and providing for an extremely low spring rate.

While it will be apparent that the preferred embodiment illustrated herein is well calculated to fulfill the objects above stated, it will be appreciated that the present invention is susceptible to modification, variation and change without departing from the scope of the invention.

We claim:

1. In combination with an automotive vehicle having sprung and unsprung portions and comprising means providing a source of vacuum pressure,
   a leveling system comprising at least one fluid actuatable leveling device for controlling the relative attitude between the vehicle portions, a source of actuating fluid for said leveling device and fluid passage defining means for communicating fluid between said source and said device,
   vacuum operated pump means communicable with said source of vacuum pressure for pumping fluid from said source to said leveling device,
   a leveling valve assembly having valve means movable between positions opening and closing a flow path for controlling the flow of actuating fluid from said pump means to said leveling device, and
   means responsive to relative movement between the sprung and unsprung portions of the vehicle for operating said valve means.

2. The combination as set forth in claim 1 which includes a vehicle engine operated vacuum source and means including a vacuum line communicating said source with said pump means.

3. The combination as set forth in claim 1 which includes fluid accumulator means for receiving fluid from said source thereof and communicating said fluid to said leveling device.

4. The combination as set forth in claim 3 which includes a vacuum operated hydraulic pump.

5. The combination as set forth in claim 4 which includes fluid accumulator means adapted to receive actuating fluid from said pump and communicate said fluid to said leveling device in response to preselected differential movement between said sprung and unsprung portions of the vehicle.

6. The combination as set forth in claim 5 which includes leveling valve means actuatable in response to preselected loaded and unloaded conditions of the vehicle to open first and second flow paths between said pump means and said leveling device.

7. The combination as set forth in claim 1 wherein said leveling valve assembly comprises means defining a first fluid passage between said source and said leveling device, means defining a second fluid passage between said source and said leveling device, a first valve member movable between positions opening and closing said first flow passage, a second valve member movable between positions opening and closing said second flow passage, and actuating means for moving said first valve member to a position opening said first flow passage when the sprung portion of the vehicle is disposed below a preselected level orientation and for moving said second valve member to a position opening said second flow passage when the sprung portion of the vehicle is disposed above said level orientation.

8. The combination as set forth in claim 7 wherein said first and second valve members comprise first and second pistons reciprocally mounted for movement toward and away from positions closing said flow passages in response to movement of said actuating means.

9. The combination as set forth in claim 8 wherein said piston members are mounted in generally spaced parallel bores, which includes first and second rotatable camming members for moving said piston members, and an actuating member movable in response to preselected changes in attitude between the sprung and unsprung portions of a vehicle for rotating said camming members.

10. The combination as set forth in claim 4 wherein said fluid accumulator and said pumping means comprise a single unitized assembly.

11. The combination as set forth in claim 3 wherein said accumulator means comprises a pair of adjacently oriented variable volume chambers providing a fluid accumulator and fluid reservoir disposed in a common enclosure therewith.

12. The combination as set forth in claim 11 which includes vacuum operated hydraulic pump means mounted on said common enclosure for pumping actuating fluid from said reservoir to said accumulator.

13. In combination in a leveling valve assembly for a vehicle leveling system and adapted to communicate actuating fluid between a source thereof and a fluid actuatable leveling device in response to preselected changes in attitude between the sprung and unsprung portions of a vehicle,
   means defining a first fluid passage between said source and said leveling device,
   means defining a second fluid passage between said source and said leveling device,
   a first valve member movable between positions opening and closing said first flow passage,
   a second valve member movable between positions opening and closing said second flow passage, and
   actuating means for moving said first valve member to a position opening said first flow passage when the sprung portion of the vehicle is disposed below a preselected level orientation and for moving said second valve member to a position opening said second flow passage when the sprung portion of the vehicle is disposed above said level orientation.

14. The combination as set forth in claim 13 which includes camming means for moving said first and second valve members between said positions opening and closing said flow passages.

15. The combination as set forth in claim 13 wherein said first and second valve members comprise first and second pistons reciprocally mounted for movement toward and away from positions closing said flow passages in response to movement of said actuating means.

16. The combination as set forth in claim 15 wherein said piston members are mounted in generally spaced parallel bores, which includes first and second rotatable camming members for moving said piston members, and an actuating member movable in response to preselected changes in attitude between the sprung and unsprung portions of a vehicle for rotating said camming members.

17. The combination as set forth in claim 16 wherein said camming members are circumferentially offset from one another and thereby sequentially actuate said piston members in response to movement of said actuating means.

18. The combination as set forth in claim 13 which includes fluid accumulator means for receiving fluid from said source thereof and for supplying said fluid to said leveling device.

19. The combination as set forth in claim 18 wherein said first flow passage communicates said fluid source with said accumulator and said second flow passage comprises a fluid return from said accumulator back to said source.

20. The combination as set forth in claim 19 which includes fluid restriction means in at least one of said passages for limiting fluid flow therethrough in response to momentary changes in attitude between the vehicle portions.

21. In combination with an automotive vehicle having sprung and unsprung portions,
   a leveling system comprising at least one fluid pressure responsive leveling device for controlling the relative attitude between the vehicle portions,
   a source of actuating fluid for said leveling device and fluid passage defining means for communicating fluid between said source and said device, a leveling valve assembly for controlling fluid through said passage defining means,
   said valve assembly including means defining a fluid passage for communicating actuating fluid between said source and said leveling device, valve means movable between positions opening and closing said passage, and actuating means operable to cause said valve means to move toward one of said positions when the sprung portion of the vehicle is disposed below a predetermined orientation, and to move toward the other of said positions when the sprung portion of the vehicle is disposed above said predetermined orientation, and
   means responsive to a preselected fluid pressure condition communicated to said leveling device for preventing pressurized fluid from being communicated thereto.

22. In combination with an automotive vehicle having sprung and unsprung portions,
   a leveling system comprising at least one fluid pressure responsive leveling device for controlling the relative attitude between the vehicle portions,
   a source of actuating fluid for said leveling device and fluid passage defining means for communicating fluid between said source and said device,
   a leveling valve assembly for controlling fluid through said passage defining means,
   said valve assembly including means defining a fluid passage for communicating actuating fluid between said source and said leveling device, valve means movable between positions opening and closing said passage, and actuating means operable to cause said valve means to move toward one of said positions when the sprung portion of the vehicle is disposed below a predetermined orientation, and to move toward the other of said positions when the sprung portion of the vehicle is disposed above said predetermined orientation, and
   means responsive to elevation of said sprung portion of said vehicle relative to said unsprung portion thereof ro preventing pressurized fluid from being communicated to said leveling device.

23. The combination as set forth in claim 22 wherein said last mentioned means includes fluid pressure responsive means for opening and closing said flow path.

24. The combination as set forth in claim 22 wherein said last mentioned means comprises a fluid chamber, means providing for fluid communication between the interior of said chamber and said fluid passage, and means including a pressurized deformable member located within said chamber for opening and closing said means communicating said chamber with said passage means.

25. The combination as set forth in claim 24 wherein said chamber is of a generally cylindrical configuration having a flow passage formed in the wall thereof, and wherein said opening and closing means comprises a pressurized expandable and contractable member disposed centrally of said chamber and adapted to move into engagement with the periphery thereof to close said last mentioned passage means.

26. The combination as set forth in claim 25 wherein said chamber comprises a fluid accumulator.

27. The combination as set forth in claim 21 wherein said last mentioned means includes fluid pressure responsive means for opening and closing said flow path.

28. The combination as set forth in claim 21 wherein said last mentioned means comprises a fluid chamber, means providing for fluid communication between the interior of said chamber and said fluid passage, and means including a pressurized deformable member located within said chamber for opening and closing said means communicating said chamber with said passage means.

29 The combination as set forth in claim 28 wherein said chamber is of a generally cylindrical configuration having a flow passage formed in the wall thereof, and wherein said opening and closing means comprises a pressurized expandable and contractable member disposed centrally of said chamber and adapted to move into engagement with the periphery thereof to close said last mentioned passage means.

30. The combination as set forth in claim 29 wherein said chamber comprises a fluid accumulator.

31. The combination as set forth in claim 8 wherein said piston members are reciprocally mounted within adjacent bores, and which includes camming means for selectively axially moving said piston means within the associated of said bores in response to preselected attitude changes between said vehicle portions.

32. The combination as set forth in claim 16 wherein said camming members are sequentially operable.

33. In combination in a leveling valve assembly for a vehicle leveling system and adapted to communicate actuating fluid between a source thereof and a fluid actuatable leveling device in response to preselected changes in attitude between the sprung and unsprung portions of a vehicle, means defining a fluid passage between said source and said leveling device, a valve member movable between positions opening and closing said flow passage, actuating means for moving said valve member in response to preselected attitude changes of said vehicle portions, and means for preventing premature actuation of said leveling device in response to momentary attitude changes of said vehicle portions, said last mentioned means comprising fluid flow restricting means for selectively controlling the flow of actuating fluid between said source and said leveling device.

34. The combination as set forth in claim 33 which includes means defining first and second fluid passages, which includes first and second valve members for opening and closing said first and second passages, respectively, and fluid restricting means for controlling fluid flow through said passages.

* * * * *